United States Patent
Koral et al.

(10) Patent No.: US 12,047,295 B2
(45) Date of Patent: *Jul. 23, 2024

(54) MICROBURST DETECTION AND MANAGEMENT

(71) Applicants: AT&T Intellectual Property I, L.P., Atlanta, GA (US); The Trustees of Princeton University, Princeton, NJ (US)

(72) Inventors: Yaron Koral, Cherry Hill, NJ (US); Simon Tse, Holmdel, NJ (US); Steven A. Monetti, Mountain Lakes, NJ (US); Tzuu-Yi Wang, Newtown, PA (US); Jennifer L. Rexford, Princeton, NJ (US); Xiaoqi Chen, Princeton, NJ (US); Shir Landau Feibish, Princeton, NJ (US)

(73) Assignees: AT&T Intellectual Property I, L.P., Atlanta, GA (US); The Trustees of Princeton University, Princeton, NJ (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/501,372

(22) Filed: Oct. 14, 2021

(65) Prior Publication Data
US 2022/0038374 A1 Feb. 3, 2022

Related U.S. Application Data

(63) Continuation of application No. 16/380,287, filed on Apr. 10, 2019, now Pat. No. 11,171,869.

(51) Int. Cl.
*H04L 47/11* (2022.01)
*H04L 43/062* (2022.01)
*H04L 43/16* (2022.01)
*H04L 47/125* (2022.01)
*H04L 47/2483* (2022.01)
*H04L 47/32* (2022.01)

(52) U.S. Cl.
CPC ............ *H04L 47/11* (2013.01); *H04L 43/062* (2013.01); *H04L 43/16* (2013.01); *H04L 47/125* (2013.01); *H04L 47/2483* (2013.01); *H04L 47/32* (2013.01)

(58) Field of Classification Search
CPC ............... H04L 43/062; H04L 43/0876; H04L 43/0882; H04L 43/16; H04L 47/11; H04L 47/12; H04L 47/125; H04L 47/2483; H04L 47/29; H04L 47/32
See application file for complete search history.

(56) References Cited

U.S. PATENT DOCUMENTS

| | | |
|---|---|---|
| 7,808,898 B2 | 10/2010 | Eswaran et al. |
| 7,948,880 B2 | 5/2011 | Kwan et al. |
| 9,055,009 B2 | 6/2015 | Chrysos et al. |

(Continued)

*Primary Examiner* — Pao Sinkantarakorn
*Assistant Examiner* — Pawaris Sinkantarakorn
(74) *Attorney, Agent, or Firm* — GUNTIN & GUST, PLC; Matthew Tropper

(57) ABSTRACT

Systems, methods, and apparatuses provide a scalable framework for analyzing queuing and transient congestion in network switches. The system reports which flows contributed to the queue buildup and enables direct per-packet action in the data plane to prevent transient congestion. The system may be configured to analyze queuing in legacy network switches.

20 Claims, 11 Drawing Sheets

(56) References Cited

U.S. PATENT DOCUMENTS

| | | |
|---|---|---|
| 9,112,784 B2 | 8/2015 | Chen et al. |
| 9,282,043 B1 | 3/2016 | Cao |
| 9,654,383 B2 | 5/2017 | Babiarz et al. |
| 2013/0155850 A1 | 6/2013 | Chrysos et al. |
| 2014/0064079 A1 | 3/2014 | Kwan et al. |
| 2014/0269288 A1 | 9/2014 | Crisan et al. |
| 2014/0269378 A1* | 9/2014 | Holbrook ............ G11C 11/4076 370/252 |
| 2015/0092591 A1 | 4/2015 | Matthews et al. |
| 2015/0124824 A1* | 5/2015 | Edsall ................. H04L 41/0893 370/392 |
| 2016/0036704 A1 | 2/2016 | Xiao et al. |
| 2016/0164791 A1 | 6/2016 | Zahemszky et al. |
| 2018/0091388 A1* | 3/2018 | Levy ........................ H04L 43/12 |
| 2018/0145906 A1* | 5/2018 | Yadav ..................... H04L 45/70 |
| 2018/0288145 A1 | 10/2018 | Levy et al. |
| 2018/0351883 A1* | 12/2018 | Calavrezo ............. H04L 49/506 |
| 2019/0042110 A1* | 2/2019 | Bharadwaj ............. G06N 20/00 |
| 2019/0158415 A1 | 5/2019 | Pan et al. |
| 2019/0334792 A1* | 10/2019 | Ayandeh ............. H04L 43/0876 |
| 2019/0379591 A1 | 12/2019 | Boughzala et al. |
| 2020/0014486 A1 | 1/2020 | Harrang et al. |
| 2020/0136983 A1* | 4/2020 | Ghanwani ............... H04L 43/04 |
| 2020/0236051 A1* | 7/2020 | Hu ......................... H04L 47/11 |
| 2020/0252300 A1 | 8/2020 | Levy-Abegnoli et al. |

\* cited by examiner

MICROBURST DETECTION AND MANAGEMENT

CROSS REFERENCE TO RELATED APPLICATIONS

This application is a continuation of, and claims priority to, U.S. patent application Ser. No. 16/380,287, filed Apr. 10, 2019, entitled "Microburst Detection and Management," the entire contents of which are hereby incorporated herein by reference.

GOVERNMENT RIGHTS

This invention was made with government support under Grant No. CCF-1535948 awarded by the National Science Foundation. The government has certain rights in the invention.

BACKGROUND

Short-lived traffic surges, known as microbursts, can cause periods of unexpected high packet delay and loss on a link. Today, preventing these outcomes requires deploying network devices (e.g., switches or routers) with larger packet buffers to absorb these microbursts, which in turn incurs higher cost. As a result, these network devices operate in very low utilization that results in low efficiency. This disclosure is directed to addressing issues in the existing technology.

SUMMARY

Short-lived traffic surges, known as microbursts, may cause periods of unexpected high packet delay and loss on a link. Disclosed herein is a system that identifies flows causing queue buildup within the data plane and address them accordingly. Once these microbursts are detected and analyzed, actions may be taken, such as load balancing the specific microburst flows, provide a different QoS to these flows, delay the flows, or reroute the flows, among other things. In addition, disclosed herein is a framework for analyzing queuing in legacy switches using link tapping and an off-path programmable switch running microburst detection and management system.

In an example, a network device may include a processor and a memory coupled with the processor that effectuates operations. The operations may include obtaining within a period, by a network device, a plurality of packets; determining, by the network device, that a subset of the plurality of packets belong to an identifiable flow; determining, by the network device, congestion associated with the network device; responsive to determining the congestion, determining, by the network device, that the identifiable flow reached a threshold percentage of the plurality of packets, wherein the threshold percentage is the highest percentage of the plurality of packets; based on the identifiable flow reaching the threshold percentage of the plurality of packets, indicating, by the network device, the identifiable flow is a culprit flow, wherein the culprit flow is a flow that is determined to significant contributor to congestion; and responsive to the identifiable flow indicated as a culprit flow, controlling, by the network device, one or more actions associated with the culprit flow, which may be associated with a queue of the network device. Actions may include immediately dropping subsequently obtained packets of the network device or other network devices along a routing path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Short-lived traffic surges can cause periods of unexpectedly high queue utilization. As a consequence, network operators may be forced to deploy more expensive switches with larger, mostly underutilized packet buffers, or risk packet loss and delay. Disclosed herein are methods, systems, and apparatus that may detect congestion as it forms and take corrective action on individual flows before the situation gets worse, which may be done in near real-time (e.g., milliseconds to seconds). The microburst detection and management system (also referred herein as Congested Queue Tracking or ConQuest) may identify the specific culprit flows responsible for the queue buildup (e.g., microbursts), and then may mark, drop, or reroute the associated packets automatically in the data plane. Conventional collection of fine-grained statistics about queue occupancy in real time is challenging, even with emerging programmable data planes. The microburst detection and management system is a system that identifies the flows causing queue buildup within the data plane. Evaluations indicate that the microburst detection and management system accurately targets the responsible flows at the sub-millisecond level, achieving Precision and Recall of over 90%. ConQuest may operate in programmable switches deployed in an operational network, or "on the side" to monitor legacy network devices that offer limited visibility into congestion.

Figure 1:
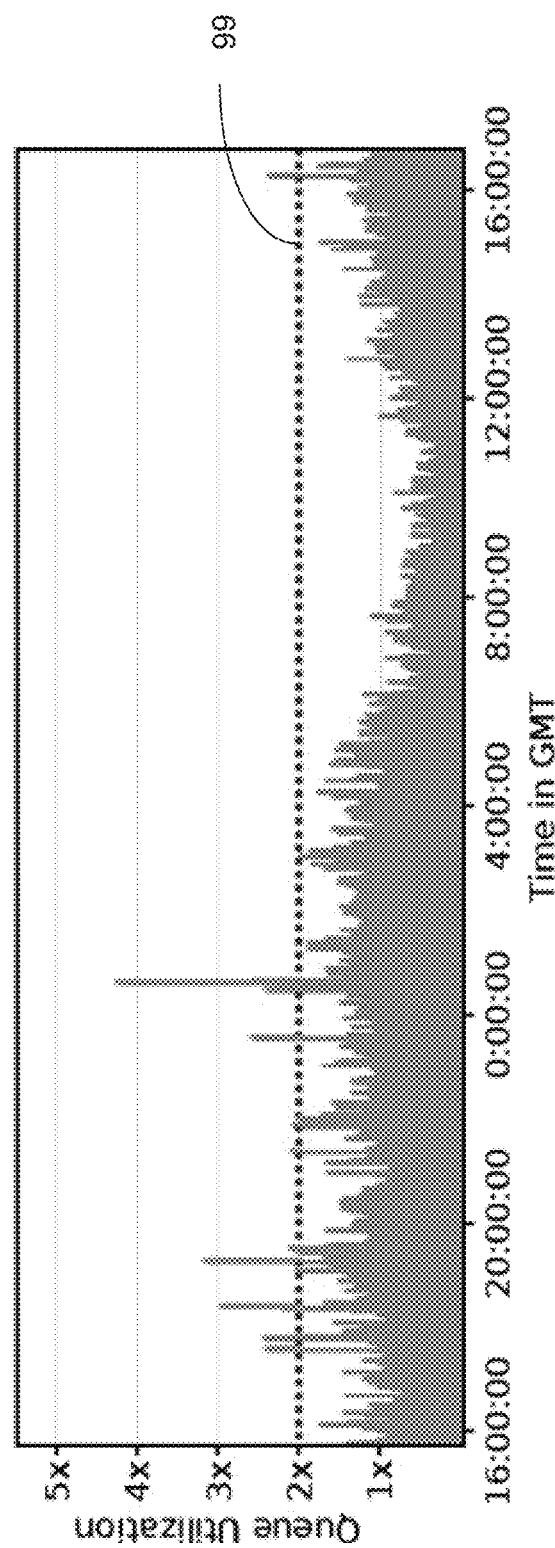
FIG. 1 illustrates queue utilization over a 24-hour period in a carrier network switch, highlighting transient congestion events with more than double the average queue length.

Queue utilization in network switches is a concern for network operators. As shown in FIG. 1, on a link with relatively stable utilization, short periods of high queue utilization can arise (e.g., microbursts). Transient congestion, which typically lasts hundreds of microseconds to tens of milliseconds, can be caused by legitimate or adversarial traffic bursts. A microburst may be considered a change of 3 to 10 times (or more) higher than average traffic rate. This short-lived congestion often leads to higher queuing delay, requiring longer buffers or otherwise risking indiscriminate packet loss. The cause of transient congestion may be understood and addressed when there is near real-time visibility into the switch's queuing dynamics. Unfortunately, most existing network devices report traffic statistics at the timescale of minutes or at best seconds. Existing network devices often only report the total queue length, providing little visibility of what is happening inside the queue. Therefore, network operators cannot find the root cause for this congestion in real time, let alone alleviate it. Unlike data-center network fabrics, which can perform congestion control by coordinating between hosts in the network, transit network operators usually cannot prevent bursty workloads from entering their networks. To maintain high performance, transit network operators are usually forced to run links at lower utilization or maintain sufficiently large queuing buffers, which may be inefficient.

Microburst detection and management may prevent high queuing delay and potential packet loss caused by transient congestion. This may be achieved by identifying the individual culprit flows responsible for the queue buildup and taking immediate action against the associated packets. Possible actions may include marking or dropping packets, sending feedback upstream to affect future packets of this flow, delaying the flow, or reporting to a collector for further analysis. Delaying the flow may include temporarily holding the microburst traffic in a separate buffer area and do not send for a period or decrease amount sent of microburst traffic (e.g., a 20% of microburst traffic sent) while sending other traffic. Subsequently, network operators may not need to maintain large buffers to withstand the presence of bursty flows. For example, they could run their network using less expensive commodity switches with smaller buffers, while sustaining high performance.

Figure 2:
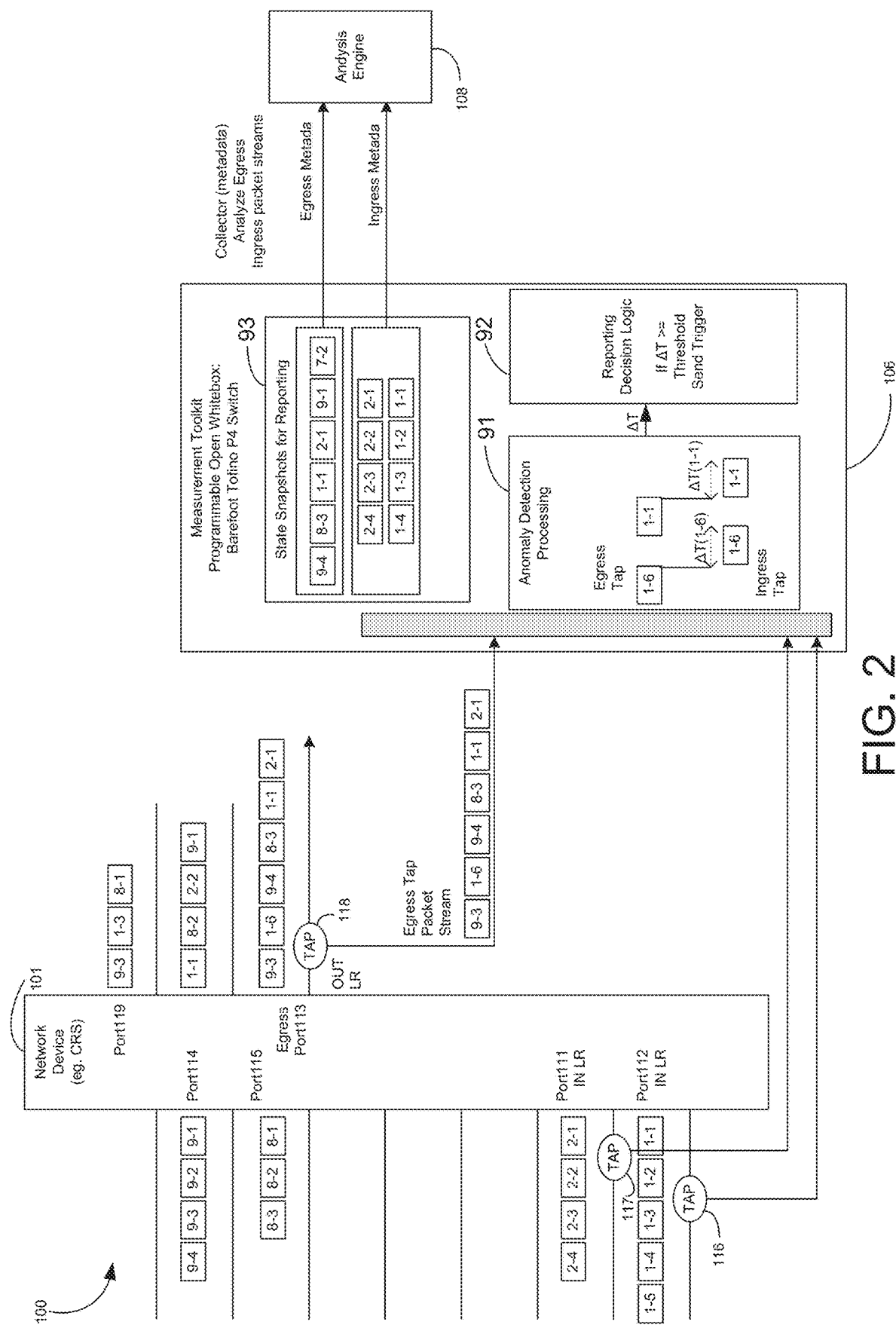
FIG. 2 illustrates an exemplary system for microburst detection and management.

FIG. 2 illustrates an exemplary system for microburst detection and management. System 100 may include network device 101, measurement device 106, and analysis engine 108. Network device 101, measurement device 106, and analysis engine 108 may be communicatively connected with each other. Network device 101 (e.g., router, server, or switch) may include multiple ingress ports (e.g., port 111, port 112, port 114, or port 115) and egress ports (e.g., port 113 or port 119). Tap 116 and tap 117 may send a copy of ingress packets to measurement device 106 and network device 101. Tap 118 may send a copy of egress packets to measurement device 106 and another network device (not shown). Taps 116, 117, and 118 may be optical taps. A tap (also referred to as network tap) is an external monitoring device that mirrors the traffic that passes between two network nodes. A tap is usually a test access point and is a hardware device inserted at a specific point in the network to monitor data. Analysis engine 108 may receive ingress or egress metadata. It is contemplated herein that instead of tapping network device 101, the operations of measurement device 106 or analysis engine 108 may be incorporated into network device 101. Further it is assumed that taps are on all ports, but, as disclosed in more detail herein, taps may not be on all ports, therefore further consideration is needed with regard to identifying flows and microbursts.

Figure 3:
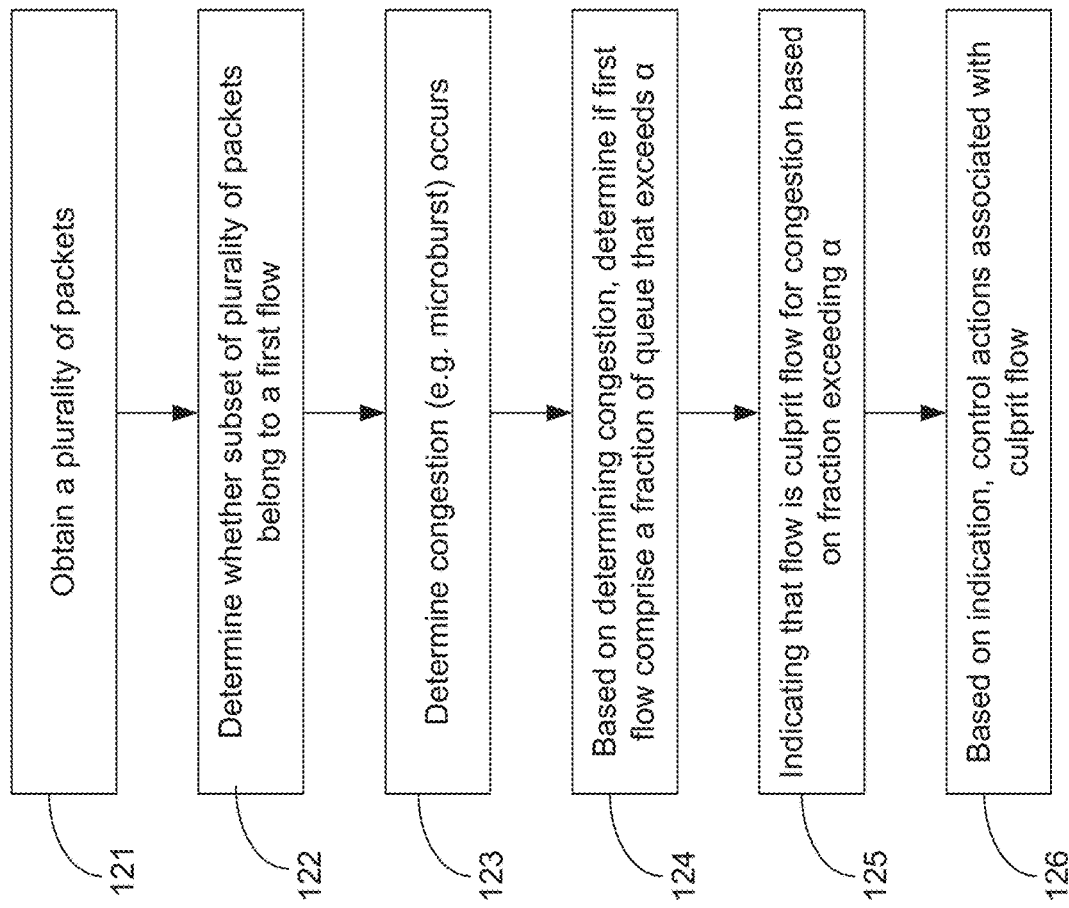
FIG. 3 illustrates an exemplary method for microburst detection and management.

FIG. 3 illustrates an exemplary method for microburst detection and management. Further details for each step are disclosed herein. At step 121, a plurality of packets may be obtained by measurement device 106. At step 122, measurement device 106 determines whether a subset of the plurality of packets belong to an identifiable flow. At step 123, congestion (e.g., microburst) is determined. At step 124, based on the congestion of step 123, determining if an identified flow within a time frame of the congestion reached a threshold (e.g., determine if flow includes a fraction of queue that exceeds $\alpha$). At step 125, indicating that the identified flow is a culprit flow for congestion based on fraction exceeding $\alpha$. The culprit flow is a flow that is determined to significantly contribute to congestion (e.g., a microburst) usually based on its percentage in the queue. At step 126, based on indication of step 125, control one or more actions associated with culprit flow. For example, adjusting quality of service or dropping packets of the culprit flow.

ConQuest identifies the flows causing the buildup in the queue, who are to "blame" for the congestion (e.g., at steps 121-123). Detecting and acting on culprit flows in real time would seem to require maintaining a precise count of how many packets each flow has in the queue, and support queries on all of these counters, all of the time. Unfortunately, it is difficult realistically to design a data structure in the data plane that meets these requirements. Usually the memory access requirement prevents an update of the same data structure in both the ingress and egress pipelines. If this were not the case, some flow size counter data structure from both ends of the queue may be maintained, adding to it when a packet enters and subtracting from it when the packet departs. Fortunately, to catch culprit flows, it is sufficient to maintain approximate flow sizes and only query the size of each packet's own flow.

Querying a packet's own flow size. To take corrective action for the flows causing congestion, as the burst is forming, the contribution is identified of the current packet's flow to the queue buildup. Thus, there is not a need to obtain a list of all culprit flows. Instead, from each packet's perspective, there is just a need to query the size of that packet's own flow within the queue, to see if the packet belongs to a culprit flow. This may simplify the requirement for the data structure that is maintained. In other words, for each packet, the question is asked: when I entered the queue, what fraction of the packets in the queue belonged to my flow?

Furthermore, to alleviate congestion, ConQuest may just focus on the heavy flows, and does not need to report precise counts for all the small flows. As long as it can distinguish the culprit flows from the harmless small flows, it is sufficient to maintain an approximate count of the flow sizes in the queue. This allows the use of approximation techniques and adapt to the constraints imposed by programmable switches.

Figure 4:
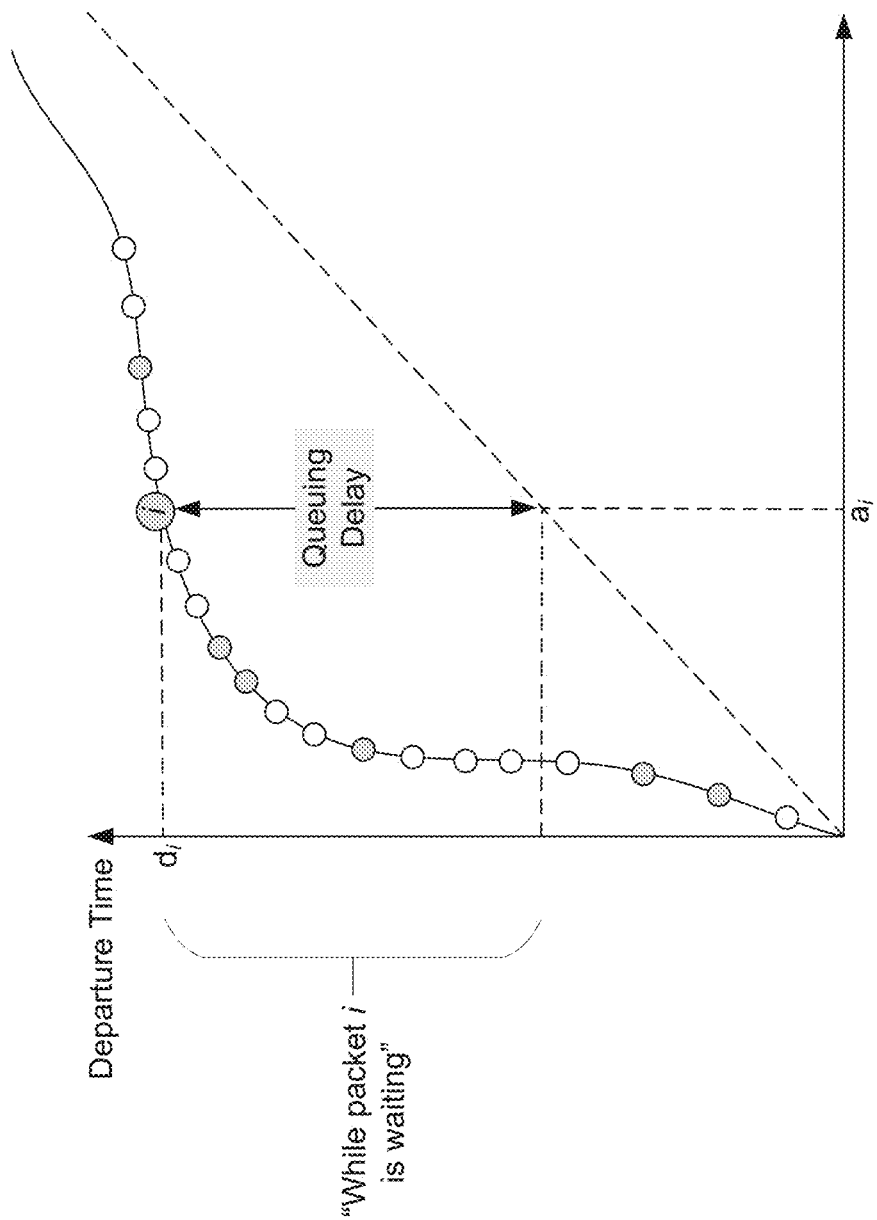
FIG. 4 illustrates an exemplary scatter plot of packet departure vs. arrival time.

A packet i of flow fi may enter the queue at time ai and depart at time di, experiencing a queuing delay of (di−ai), as shown in FIG. 4. For each egress port, the packet-processing pipeline witnesses packets leaving the queue as a stream of (ai, di, fi) tuples. At the egress pipeline of the switch, ai and di are provided in the queuing metadata, and fi is extracted from packet headers. Congestion arises when the queuing delay of one or more packets exceeds a threshold $\tau$. When congestion occurs, the system aims to identify the culprit flows as those consuming at least an $\alpha$ fraction of the congested queue (e.g., step 123-123 of FIG. 3). Note that $\tau$ may be determined by operational need of application or queue size. With regarding to operational need, in an example, virtual reality (VR) or augmented reality (AR) may require 60 fps that is greater than 16 ms, so latency of 20 ms is considered high for VR related service. With regard to queue size, in an example, if maximum queue translates to 10 ms of latency, then τ should be smaller than 10 ms to be meaningful, but should be a fraction (e.g., a quarter) of maximum, so choose 2 ms. Too small τ (e.g. 1% of total queue) makes system less accurate, too large (e.g. 80%) may cause the system to have less leeway to react to queue buildup when it exceeds τ, and cause packet loss when it quickly goes to 100% even if reaction started at 80%.

We also denote {x|$a_i$≤$d_x$≤$d_i$} as the packets that departed the queue, while packet i was waiting in the queue. Note that for a FIFO queue, this definition may be equivalent to what packets were in the queue when packet i entered.

For each packet i, if ($d_i$−$a_i$)≥τ, ConQuest tries to answer the following query: Does the fraction of packets in {x|$a_i$≤$d_x$≤$d_i$} that satisfy $f_x$=$f_i$ exceed the culprit threshold α? If the answer is yes (see step 123-125), $f_i$ is considered a culprit flow and the data plane should take a corrective action (e.g., mark, drop, report, or reroute), possibly weighted by the fraction of traffic, on packet i. Culprit threshold α may relate to the flow size distribution of typical system workload. For example, when burst happens there are usually only 5 flows occupying 70%, 10%, 10%, 5%, 5%, then alpha=50% is very reasonable. If when burst happens there are 10,000 flows, the largest one occupying 2%, next one 1.5%, next one 0.1%, 0.09%, etc., then alpha=1% is reasonable. This highly depend on the nature of traffic monitored and may best be chose by past measurements to choose an optimal value.

In FIG. 4 packets belonging to $f_i$ are shown as hatched circles. For this example, α=20% is used. When packet i arrives, the queue has four packets from flow $f_i$ in the {x|$a_i$≤$d_x$≤$d_i$} range (satisfying $f_x$=$f_i$), including i itself. This roughly accounts for 40% of all the packets that were served by the queue while i was waiting (greater than α), thus flow $f_i$ contributes to queue buildup significantly and is called a culprit flow. After detecting the culprit flow, the switch can avoid further queue buildup by, for example, marking, dropping, or rerouting packet i or subsequent packets from flow $f_i$.

To overcome the challenges of running in the data plane, ConQuest may use a snapshot-based data structure to record traffic and answer queries (e.g., step 121—"which flow has its size in the queue exceeded alpha fraction", the alpha above). In this section there is a description of why a snapshot-based data structure design may be used. Also, additional details are provided with regard to how the data structure may be used to answer near real-time flow-size queries and how snapshots in the data structure may be cleaned or reused without controller mediation. For simplicity, definitions and discussions in this section assume packets have unit size. However, it is straightforward to extend each definition to consider packet length.

Given a stream of packets with ($a_i$, $d_i$, $f_i$) tuples, ConQuest determines how many packets in the queue (i.e., {x|$a_i$≤$d_x$≤$d_i$}) belong to the same flow as packet i (e.g., $f_x$=$f_i$). During congestion, if these packets compose a fraction of the queue that exceeds α, $f_i$ is a culprit flow.

To determine if a packet is a part of a culprit flow, ConQuest maintains a data structure for past packet departures. Whenever a packet departs the queue, ConQuest queries packets in the past, based on the time range [$a_i$, $d_i$], and also inserts this packet and its departure timestamp (i, $d_i$) into the data structure to support future queries.

When implementing the above data structure on Protocol Independent Switch Architecture (PISA) switches, Con-Quest may take into account a set of constraints imposed by the architecture, as described below. A difficulty that has been observed for maintaining such a data structure is to accurately delete expired packets, whose departure timestamp had become too small to be included in any future packet's query. Given the strict processing time bound, it may be challenging to precisely track each packet's expiration for deletion. For this reason, microburst detection and management may use time-window snapshots that allow implicit deletion of expired packets in bulk.

Figure 5:
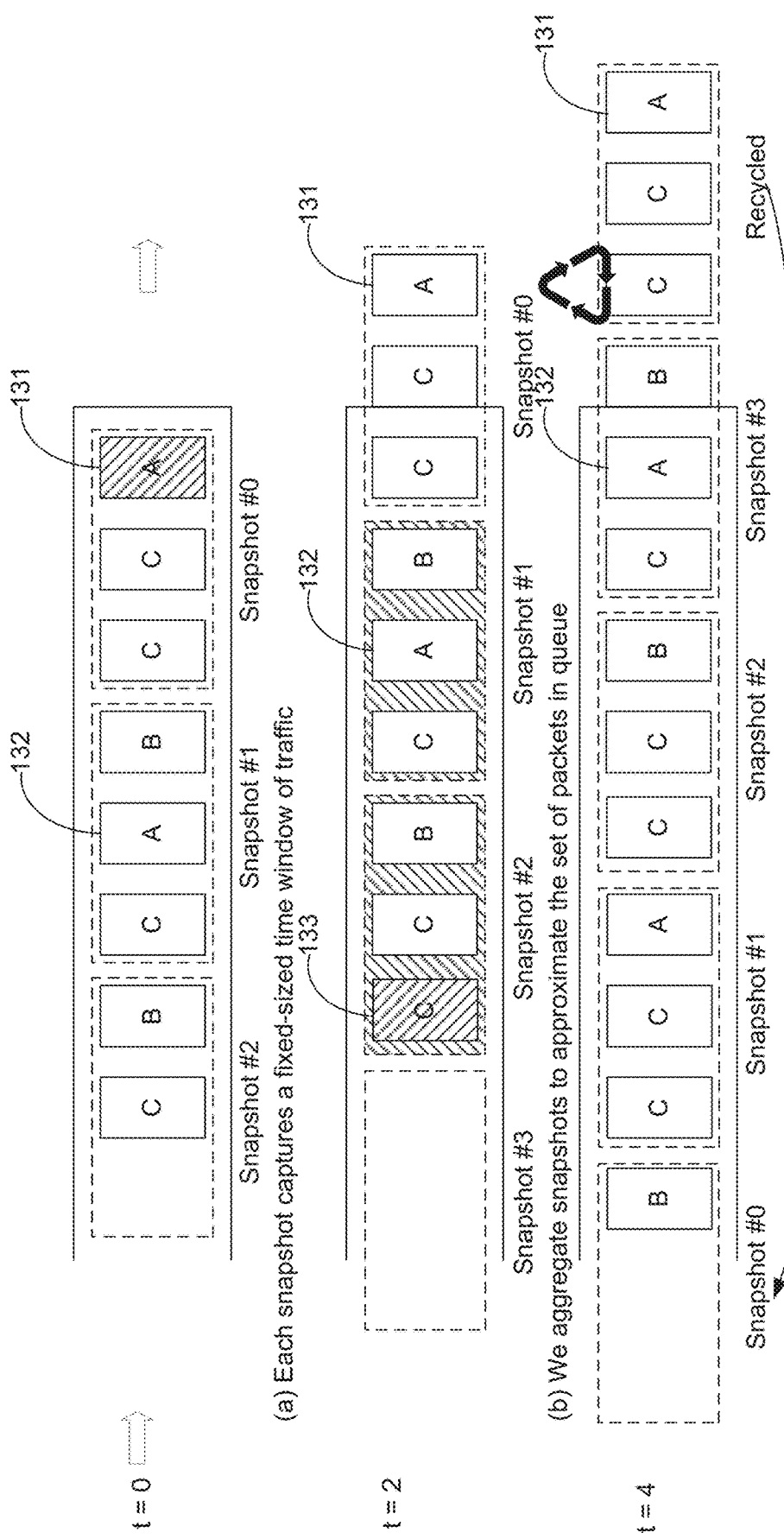
FIG. 5 illustrates an exemplary traffic time-window snapshots on a first in first out queue.

The time-window snapshots structure works as follows. First, split the departing traffic into small time windows, each lasting a fixed interval T. The packets may be grouped by their departure timestamp. For example, in FIG. 5A, if time window T=3 is chosen, the rightmost packet (packet 131 of flow A) has a departure timestamp $d_i$=0, thus it goes to time window 0/T=0. The other packet 131 from flow A departs later at time 4 and has a departure timestamp d j=4 (as shown in FIG. 5C), thus falling in window [4/T]=1.

During each time window, the total number of packets for each flow are counted. Afterwards, this snapshot may be queried to obtain the sizes of different flows on behalf of other packets.

Using time window snapshots, old packets may be implicitly deleted in bulk from the system by no longer querying the oldest snapshot. They can be forgotten about or recycled and reused (illustrated in FIG. 5C). Recycling snapshots are described in more detail in herein.

Since it is preferable to analyze congestion and take action directly in the data plane, the snapshots also need to be queried within the data plane, using primitive operations that PISA supports. If the number of flows is limited and known beforehand, per-flow counters may be assigned. For a transit network with flow identifiers not known beforehand, sketches may be utilized, or approximate data structures, as the heavy flows in the queue are cared about the most. A sketch that supports inserting or incrementing counts and querying flow sizes with reasonable accuracy may achieve goals; the Count-Min Sketch (CMS) data structure may be used. The CMS is an approximate data structure which can estimate flow sizes with a possible overestimation error due to hash collisions. The error bound is determined by the selected size of the structure.

There are two kinds of approximation errors that should be considered when the queue analyzed in this approach. When traffic is sliced into time windows, the query for a particular time range [$a_i$, $d_i$] can have some rounding error. Meanwhile, the use of sketches to maintain the counters may incur some approximation error.

Ideally, to decide if packet i is a culprit the system may look backward in time and compute $f_i$'s flow size within the departure time range [$a_i$, $d_i$]. ConQuest may approximate this range by looking at several recent time windows: from window [$a_i$/T] to window [$d_i$/T]. Thus, if ConQuest aggregates the flow size of $f_i$ reported by the corresponding snapshots, ConQuest may know approximately how many packets from $f_i$ departed during [$a_i$, $d_i$].

As a concrete example, in FIG. 5B, the leftmost packet (packet 133) from flow C arrived at $a_i$=2. Later, packet 133 departs the queue at $d_i$=8 (not shown in the figure). The packets of interest are those that departed in the time range [2, 8], i.e., the seven packets shown inside the queue in FIG. 5B out of these packets, there are four packets from flow C. As shown in FIG. 5B there are four snapshots, each may have three packets. Snapshot #1 recorded one packet for flow C, while Snapshot #2 recorded two packets for flow C. By aggregating the two shaded snapshots, #1 and #2, ConQuest can get an approximate value 3, i.e., there are around three packets from flow C that departed between time [2, 8].

Aggregating snapshots may cause approximately a T rounding error at both ends of the range. When the queuing delay (di−ai) is much larger than T, e.g., when the queue is congested and therefore ConQuest is interested in measuring, ConQuest has smaller relative error.

Besides simple summation, ConQuest may also aggregate snapshots differently to compute other metrics in the data plane. This may create more applications for snapshots beyond analyzing congestion. For example, ConQuest can detect rapid changes in flow throughput in the data plane, by computing the difference between the flow sizes reported by the two most recent snapshots. This technique would help network operators locate flows which rapidly ramp-up without obeying congestion control. Note that currently ConQuest uses a fraction of queuing delay as the time window, while different applications may find a different time window more suitable.

Cleaning and Reusing Expired Snapshot is described below. For a FIFO queue in the switch, the maximum queuing delay (di−ai) is bounded by the maximum queuing buffer size Q (bytes) divided by line rate R (bytes/second). Subsequently, it is known that each snapshot would only be queried for the next [Q/(R×T)] time windows. As a concrete example, a queue with R=10 Gbps drain rate and maximum Q=5 MB buffer size has Q/R=4 ms; if T=1 ms time window is used, only the most recent four time windows may be queried.

Therefore, there is only a need to maintain a constant number of recent snapshots. FIG. 5C illustrates that when the packets recorded in a snapshot are no longer useful, ConQuest may recycle the snapshot for recording future traffic.

Figure 6:
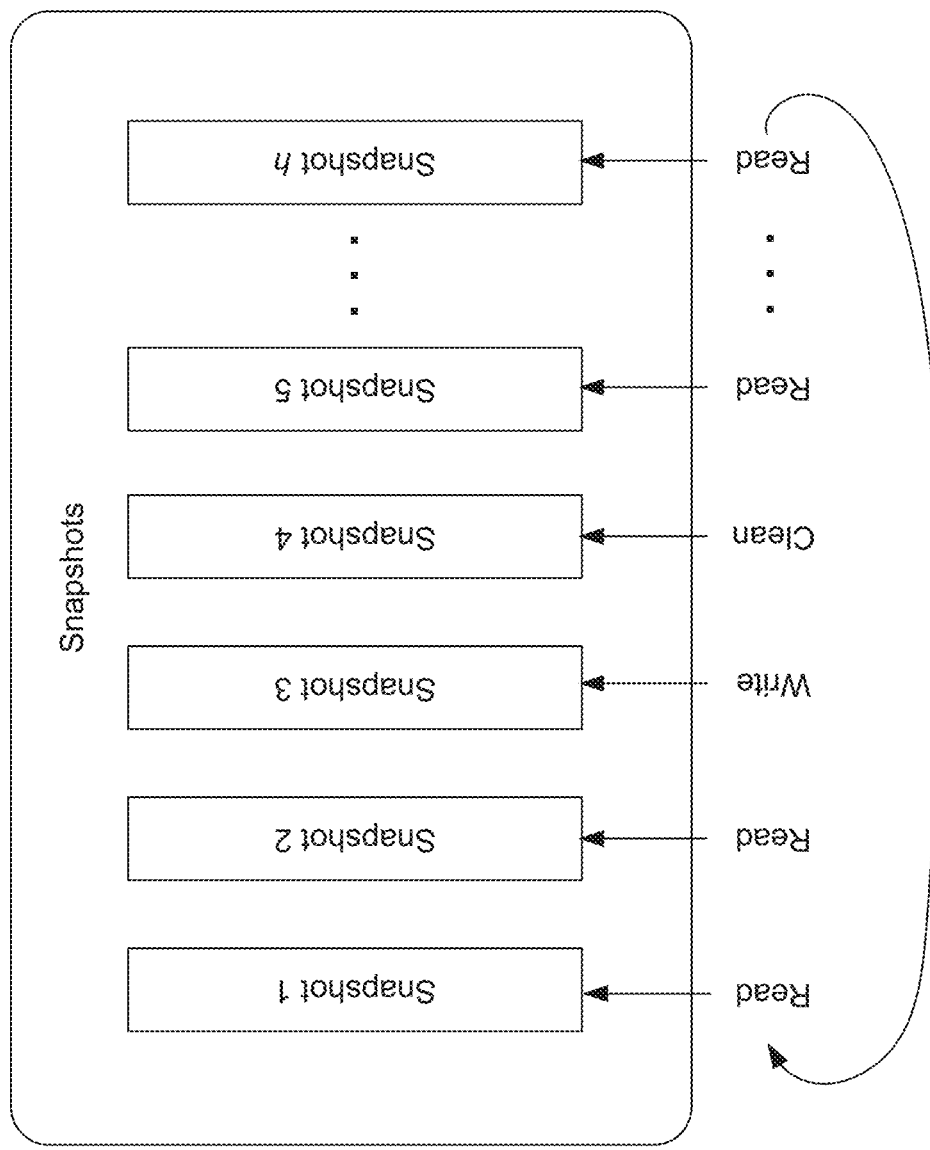
FIG. 6 illustrates round-robin snapshot framework.

We can maintain h>[Q/(R×T)] snapshots in total and use them in a Round-Robin fashion. As illustrated in FIG. 6 the roles of snapshots rotate every T seconds, synchronized with the progress of the time window.

Every packet leaving the queue can be added to the snapshot that is currently in a Write phase, according to the current time window (modulo h). The other most recent h−2 snapshots are in Read phase and can be queried. The oldest snapshot is no longer useful and is in Clean phase. The data structure is cleared and prepared for writing in the next time window.

To illustrate the idea further, let us assign h variable indices to indicate which snapshot to read, write, or clean: $I^w$ is the write index, $I^c$ is the clean index, and $I^r_1, \ldots, I^r_{h-2}$ are the read indices. Within a snapshot window, for each packet i of flow $f_i$ that departs the queue, the following is performed:

1. In snapshot $I^w$ ConQuest increments the count of flow $f_i$ by 1.

2. To extract the estimated flow size in the queue for $f_i$, ConQuest may first read the $n=[d_i/T]-[a_i/T]$ most recent snapshots based on the arrival time $a_i$ and departure time $d_i$ of the packet i. Subsequently, ConQuest sums the estimated flow sizes reported by $I^r_1, \ldots, I^r_n$.

3. Data structure in snapshot $I^C$ is being cleared for future use.

Implementing the snapshot round-robin is straightforward in PISA switches. First, the PISA switch tags $a_i$ and $d_i$ to each packet as a part of the queuing metadata, and extract packet header fields to determine flow ID $f_i$. ConQuest can divide $d_i$ by the time window T to find the current time window $[d_i/T]$. Subsequently, ConQuest may compute modulo over h to find $I^W$, the current snapshot to write into. ConQuest may also derive other indexes for read and clean, based on $I^C=I^W+1$ mod h and $I^r_i=I^W$ mod h. ConQuest may also decide how many old snapshots to read from by dividing $a_i$ over T. Due to the limited arithmetic operations supported by the PISA switch, implementing division and rounding is not straightforward. These operations may be implemented in the PISA switch by using bitwise right shift, and by erasing the most significant bits. Note that it is contemplated that both T and h be integer powers of two in order to work well.

In an exemplary implementation of ConQuest, each snapshot may be represented as several hash-indexed arrays to form a Count-Min Sketch. To read from or write to a snapshot, a packet first finds the indices based on flow ID $f_i$, then read or increment the value at those indices. Since snapshots rotate quickly, ConQuest cannot rely on the switch controller to clean out register memory arrays. To clean and recycle a snapshot in the data plane, ConQuest may maintain a cyclic pointer as the index to be cleaned in the array. The pointer is incremented once per packet; when it grows above the largest index in the array it overflows back to zero. This way, the incoming packets can clean the oldest snapshot cyclically, by writing zeroes one index at a time to every index in the array. ConQuest may store the pointer itself in a single-slot register memory array in an earlier stage.

The operation on each snapshot may take several hardware pipeline stages. If snapshots are arranged sequentially, ConQuest may run out of hardware pipeline stages. Fortunately, the operations performed are independent across snapshots and can be done in parallel. ConQuest can place multiple hash-indexed arrays in the same pipeline stage and execute their actions simultaneously, essentially "stacking" multiple snapshots to save the number of pipeline stages needed to implement ConQuest. The height of stacking depends on the number of parallel operations that may be performed per stage on the particular hardware target.

Two design choices for ConQuest are disclosed below. The design choices may include the snapshot data structure's memory size and the snapshot time window size. Using more memory to construct larger CountMin Sketch (CMS) data structures reduces collisions and improves accuracy. Using a smaller time window T provides better granularity when approximating the range [ai, di] by lowering the rounding error, at the cost of using more pipeline stages.

Effect of Limited Per-Snapshot Memory. The memory needed to achieve adequate accuracy is considered below. In a prototype, for each snapshot a 4-row CMS was used to record and estimate the total flow size for each flow during each snapshot time window. When memory is insufficient, CMS suffers from hash collisions and over-estimates the size of flows, reporting more false positives and lowering Precision (but Recall does not change since CMS would not underestimate flow size). The effect of varying the total number of counters in the CMS on Precision was observed. The Precision plateaus at 24 to 32 counters (6 to 8 columns per row) with diminishing returns for allocating additional counters.

It should be noted that ConQuest's Precision is defined as the number of culprit packets correctly estimated by ConQuest divided by all packets ConQuest believed to be culprit, and its Recall is defined as the number of culprit packets correctly estimated divided by the ground truth number of culprit packets. As a standard metric for evaluating a binary classifier, the Precision and Recall curve captures how ConQuest trades false positives for false negatives and achieves balanced accuracy.

Increasing the number of snapshots h (therefore using a shorter time window T) reduces ConQuest's rounding error when computing [ai/T] and [di/T]. Using fewer snapshots (and larger windows) would cause bursts that departed immediately before ai to be erroneously included in the [ai, di] range, thus the rounding error would lead to lower Recall.

Estimating the Flow Size Distribution: ConQuest may produce flow size estimates for all flows, not only the largest ones. Thus, the snapshots may be used to report the flow size distribution for all packets during a congestion. A network operator may use such a distribution to gain insights on the nature of congestion in a specific switch and decide on the most appropriate action. For example, if there's usually only one large flow occupying 90% of the queue, then it may be sensible to mark or drop the heaviest flow.

Control Actions on the Culprit Flows (e.g., step 126 of FIG. 3). Discuss below are the potential actions that may be taken to alleviate congestion. FIG. 1 illustrates a simulated flow. During periods of congestion, a flow above the marked threshold line 99 occupies most of the queue, whereas the other flows do not surpass the marked threshold. Therefore, acting on the above the line flows alone has the potential to significantly reduce the required buffer size (e.g., from 8 MB to 2 MB), while avoiding loss and delay for the other flows.

Act on the current packet. The switch data plane can mark the Early Congestion Notification (ECN) bit of the packets of a culprit flow. If queuing delay deteriorates further, the switch (or other network device) may go a step further by dropping such packets. Dropping all packets with a probability proportional to a small constant c that depends on the queue utilization, is equivalent to the primitive Random Early Detection (RED) queuing discipline. Instead, flow f's weight wf may be used in the dropping probability. For example, dropping the packet with probability P[drop]∝max (wf−c, 0)2. ConQuest therefore enables fast prototyping of active queue management algorithms that target culprit flows by using probabilistic dropping.

Act on future packets. Upon identifying a culprit flow, the switch may feed this information from the egress pipeline back to the ingress pipeline using packet recirculation. The ingress pipeline may then prevent this flow from exacerbating the imminent queue buildup, by re-routing, rate-limiting, or dropping the packets from this flow temporarily.

Report and aggregate flows. Transient congestion is sometimes not caused by individual culprit flows. In some cases, the cause of the congestion may be identified by defining flows at a coarser level of granularity. For example, TCP incast may be caused by many sources sending packets to the same destination simultaneously and can be accurately captured by defining flows by destination IP address. In other cases, ConQuest may report packets from culprit flows to a software collector for further analysis, such as aggregating the reports to detect hierarchical heavy hitters or other groupings of flows belonging to a single distributed application (e.g., coflows).

General Queuing Disciplines: Practical switch configuration sometimes incorporate non-FIFO queuing due to multiple traffic classes. Unlike a FIFO queue, the queuing delay can be unbounded for packets in a general non-FIFO queuing setting. An upperbound may be specified (e.g., based on expected average delay) for the queuing delay (di−ai) based on practical experience, or maintain multiple hierarchical groups of snapshot with different timescales. For example, three groups of snapshots may be maintained, with the first group of snapshots each recording traffic in a time window of T1=100 μs. The second group may have a larger time window T2=1 ms, and the third group may have T3=10 ms. When a packet experienced a 32.1 ms delay, one snapshot may be aggregated from the first group, two from the second group, and three from the third group; this allows us to query T1+2T2+3T3=32.1 ms duration of recent packet departures.

The queuing delay analysis may be further generalized beyond a single switch. Network operators may be interested in analyzing the end-to-end delay a packet experienced between the time it entered and the time it departed the network. Using this analysis, it can be determined which flows caused increased latency for other packets at which queue. This analysis may also be performed, as long as (ai, di) pairs can be collected and analyzed.

In summary, short-lived traffic surges, known as microbursts, can cause periods of unexpected high packet delay and loss on a link. Conventionally, preventing these outcomes requires deploying switches with larger packet buffers to absorb these microbursts, which in turn incurs higher cost. As a result, these routers operate in very low utilization that results in low efficiency. Microbursts are not detected today since the existing network equipment is not capable to perform measurements in term of microseconds, which is required in order to catch an occurrence of a microburst.

Data plane capabilities support of programmable network devices. These capabilities allow finer grained measurements in switches (e.g., using a programming language called P4). Still, even with programmable capabilities, the available resources that a network programmer has to implement a fine-grained measurement such as one that detect microburst, are scarce. A programmer has limited amount of memory and a set of strict constraints on how data transfers between different pipeline stages of the network device, for example a P4 switch. The subject matter described herein, provides a method to store the necessary network information to detect microbursts in a compact efficient way that fits the hardware constraints.

Once these microbursts are detected and analyzed, one can use dedicated measures such as load balancing the specific microburst flows, provide a different QoS to these flows, delay or reroute them. Also, instead of allocating expensive equipment for the entire network, these microbursts can be diverted or anticipated in a small set of locations. In this case the operator can allocate the more expensive network equipment only to these places. The disclosed subject matter may allow for more accurate network planning, which may in-turn introduce cost reduction in network equipment, among other things. Hence this solution may drive network costs down for carrier.

ConQuest can achieve high accuracy (over 90% Precision and Recall) using a modest amount of register memory (less than 2 KB). The algorithm supports general queuing disciplines, not just first-in-first-out (FIFO).

Described below is more detail with regard to switch architecture (e.g., PISA switches) that may implement ConQuest. A new generation of programmable switches offers greater visibility into queue dynamics as well as more flexible packet processing. Moreover, they may perform customized actions on each packet, which is crucial for detecting and alleviating congestion in the data plane. Yet, in conventional systems, performing sophisticated analysis completely within the data plane is still challenging. To operate at line rate, these switches process packets in a hardware pipeline with a limited number of stages and a limited number of operations per stage. Furthermore, the memory for storing state across packets is limited, and each memory unit is bound to a particular stage in the pipeline.

These constraints and an overview of the measurement problem are disclosed in more detail herein.

To analyze congestion, a mechanism is needed to identify the flows contributing to queue buildup in near real time. Described in more detail below is a description of the queuing and packet-processing model of an exemplary switch architecture (e.g., Protocol Independent Switch Architecture (PISA)).

Figure 7:
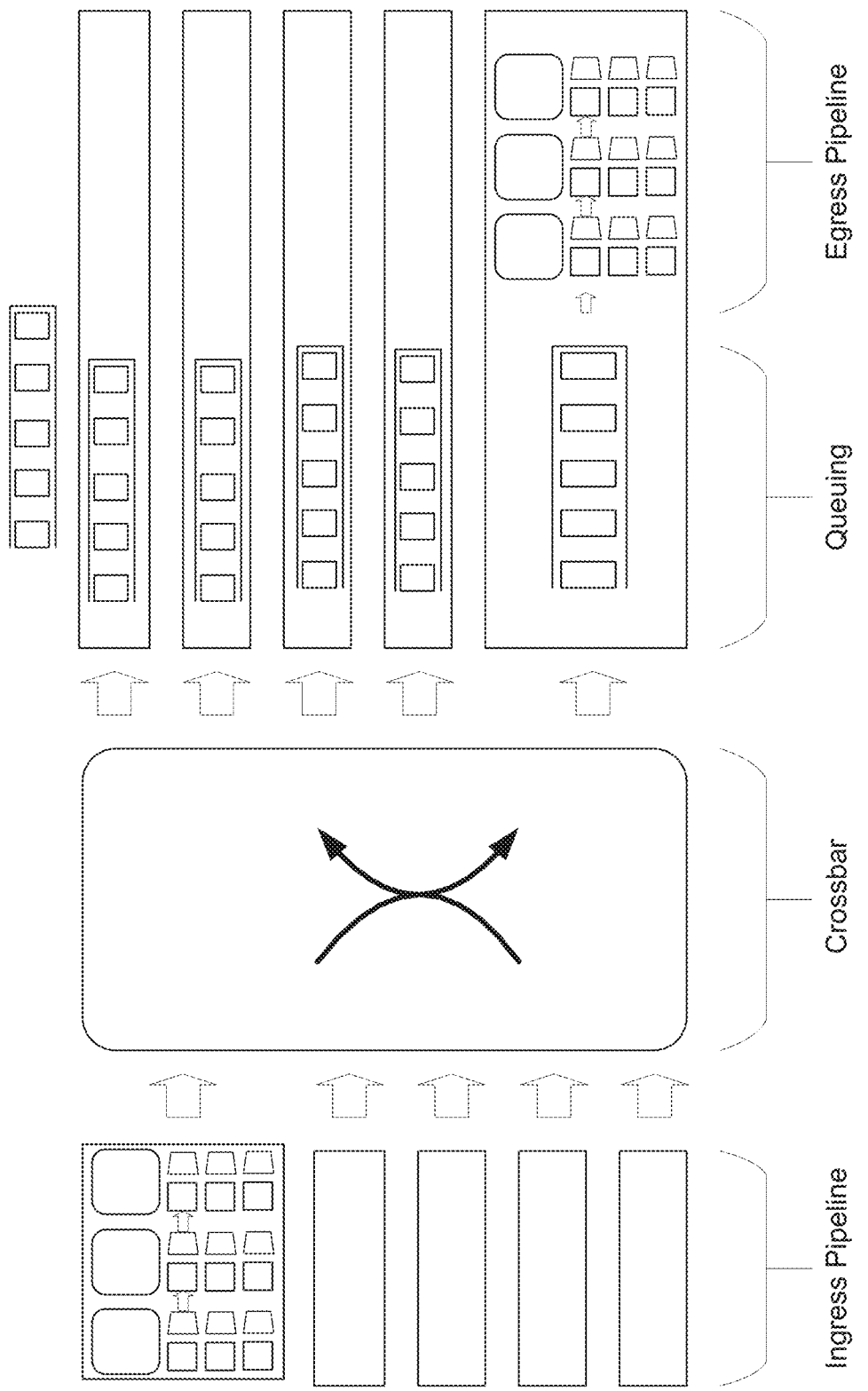
FIG. 7 illustrates an exemplary queuing in a protocol independent switch architecture.

FIG. 7 illustrates several key components of a PISA switch. To achieve low latency and high throughput, PISA switches process packets in a pipeline with a limited number of stages. A PISA switch is composed of at least one ingress pipeline, a crossbar, and at least one egress pipeline. Each egress port is served by one or more queues.

Packet processing pipeline. Each pipeline stage consists of a match-action unit and a limited amount of stateful register memory, and supports a limited number of concurrent operations. A packet traversing the pipeline may access two kinds of state: (i) metadata that a packet carries from one stage to the next and (ii) the register memory arrays associated with each stage. At any given time, different pipeline stages process different packets simultaneously. Therefore, any register memory array can only be accessed from a particular pipeline stage; otherwise, concurrent writes from different stages by different packets could lead to hazards.

Queuing discipline. Upon entering the switch, a packet first goes through ingress pipeline processing to determine its egress port. Subsequently, the packet enters a queue associated with the selected egress port. Upon exiting the queue, the packet undergoes egress processing before leaving the switch. For ease of illustration, the case where each egress port is associated with a single FIFO (first-in-first-out) queue is considered.

Challenges of running on PISA switches may include per-stage memory access, limited pipeline stages, or no controller assistance, among other things. With regard to per-stage memory access, a packet may only access each register memory array once as it goes through the packet processing pipeline. Although it is possible to recirculate a packet, any recirculated packet must compete with incoming packets for resources, possibly reducing throughput. With regard to limited pipeline stages, practical switches have a limited number of pipeline stages to maintain low forwarding latency. Thus, there may be a need to parallelize computation as much as possible to fit sophisticated algorithms in the data plane. With regard to controller assistance, since ConQuest works on the timescale of individual packets, any action by a software controller would lag behind. The switch controller (onboard CPU) may not be used to help maintain the data structure or perform garbage collection. ConQuest should perform all data-structure housekeeping within the data plane.

Monitoring Queues on Legacy Devices: Legacy network devices are not designed for precise queuing analysis. They often support polling the queue length statistics, but only at a coarse-grained time interval. Furthermore, they provide no information about which flows are occupying the queue. By monitoring and analyzing packets going through the legacy devices, ConQuest can have a much closer look at the underlying congestion. Furthermore, a more detailed understanding of typical queuing dynamics in the network can help operators make informed decisions regarding whether/when/where to deploy programmable commodity switches. Meanwhile, tapping links is quite easy in a carrier network, as the equipment for tapping is already in place.

FIG. 2 illustrates the setup for using a PISA programmable switch to monitor queuing in a legacy switch. We tap a subset of the legacy switch's ingress and egress ports and mirror their traffic to the PISA switch. The PISA switch records the arrival timestamps ($a_i$) and departure timestamps ($d_i$) for packets going through the legacy switch, based on their time of appearance on the tapped link. A stream of ($a_i$, $d_i$, $f_i$) tuples is obtained for the queue in the legacy device, and ConQuest may be run on the programmable switch to perform the same queuing analysis. ConQuest may detect transient congestion and report culprit flows. However, ConQuest may not be able to act on individual packets in this non-intrusive tapping setup.

There are several practical considerations for this tapping setup. First, all tapped links have equal tapping latency. A higher latency would not affect our analysis, as it creates equal offset for $a_i$ and $d_i$. However, an inconsistency in latency may cause persistent error in estimated queuing delay. Also, in a multi-pipeline programmable switch, tapped links need to enter at ports associated with the same ingress packet-processing pipeline, so the arriving and departing packets can have access to the same register memory array. Finally, note that the total tapped throughput is not limited by the line rate or maximum switching throughput of the programmable switch, as ConQuest only requires programmable processing—there is no need to forward or queue the tapped packets. Therefore, ConQuest may be used at the ingress pipeline of the programmable switch under this setup, to avoid being unnecessarily limited by the throughput of the egress links.

Matching Ingress/Egress Packets: A major implementation challenges is matching packets between tapped ingress and egress links. Once packets are matched, queuing latency may be derived for the monitored egress port in the legacy switch. For multiple monitored egress ports, a copy of ConQuest may be run in the programmable switch for each egress port in the legacy switch.

Matching packets. We would like to recover the (ai, di, fi) tuple from the tapped traffic. Getting di is relatively straightforward, as we can witness all packets departing from the queue at the tapped egress port. The packet header may be parsed to get flow ID fi.

If the same packet comes from a tapped ingress link, then ai is known for this packet. The programmable switch needs to match the two appearances and pair ai with di.

When the programmable switch first sees packet i from the tapped ingress link, it uses a packet identifier IDi as the hash key to store the (IDi, ai) pair in a hash-indexed register memory array. Later, when it sees i again from the tapped egress link, it tries to retrieve the entry for packet i to get ai and erase the entry. A packet identifier IDi need to be generated in order to recognize the two appearances of the same packet and distinguish it from other packets.

For IPv4 packets, the IPID field may be examined. For TCP packets, the sequence/ack number may be observed to distinguish individual packets within the same flow. In an exemplary implementation the usually unique header fields (sequence numbers, checksums, etc.) may be taken and hash all of them using CRC32 to form a 32-bit packet identifier $ID_i$.

Hash collisions. Although a collision for the 32-bit packet ID is possible, it is unlikely to happen given the timescale ConQuest is working on—ConQuest sees much less than $2^{32}$ packets during an entire cycle of snapshot rotation, which should be roughly equivalent to the maximum queuing delay in a switch. Two different packets appearing on tapped links on this timescale are unlikely to have the same packet identifier.

Meanwhile, as arrival timestamps are stored in a hash-indexed register memory array, hash collision may cause failures in finding $a_i$ when multiple packets are hashed into the same entry in the array. A sufficiently large array must be maintained to reduce hash collisions to an adequately low level. In practice, the size of the array should be as large as the maximum number of packets in the monitored queue. In a prototype implementation 65,536 entries were used, about the same magnitude as the maximum number of packets in queue.

When a collision happens, the egress packet i may be coupled with an ingress packet entry $(ID_j, a_j)$ with a different packet identifier $ID_j = ID_i$ and fail to match, thus $a_i$ may be missing, and queuing delay $(d_i - a_i)$ becomes unknown. This is similar to the "Unmonitored Ingress" situation discussed in the next subsection. This packet may be ignored for analyzing queuing delay but still record it for the current time window, and therefore, occasional collisions would not affect our congestion analysis.

Unmonitored Egress: It is contemplated herein that ingress packets may not be observed again at the tapped egress link. Some of them may be routed to an egress link that is not being monitored and some of them may be dropped due to congestion. For example, a packet may be tapped on an ingress link, but was routed to an egress port not being tapped. These packets would fill up the register memory array with packet IDs and arrival timestamps that would not be matched later and are therefore of little use. Meanwhile, the register memory array cannot garbage collect by itself, and would gradually get filled by these entries. This issue may be addressed by implicitly expiring entries. For example, allowing an entry to be evicted from the array once its arrival timestamp has aged more than the maximum possible queuing delay and can thus be considered expired.

A flow may exit the switch from multiple egress links. If only a subset of a flow's packets appears on the tapped egress link, only this subset contributes to the congestion in the monitored queue. ConQuest analyzes congestion for this subset of packets.

Unmonitored ingress. Symmetrically, some packets observed on an egress link might have entered the switch from an ingress link that is not being monitored. In an example, a packet comes in from an untapped ingress port, but appears on the tapped egress port. For these packets, their arrival timestamp was not observed. However, they may still be insert into the current snapshot as usual, as they contributed to the congestion at our monitored egress port and snapshot insertion only requires the departure timestamp.

A flow may also enter the switch from multiple ingress links. If only a subset of the flow's packets is coming from tapped ingress links, only this subset has a valid arrival timestamp in the system. Thus, ConQuest may only identify whether such a packet is a culprit for packets in this subset. However, since all packets in this flow are inserted to the snapshots, regardless of if their ingress link is tapped or not, they are accounted for when determining the flow's size in the queue.

Network congestion in data networking and queueing may be considered the reduced quality of service that occurs when a network node or link is carrying more data than it can handle. Effects include queueing delay, packet loss, or the blocking of new connections. A consequence of congestion is that an incremental increase in offered load may lead only to a small increase or even a decrease in network throughput.

Figure 8:
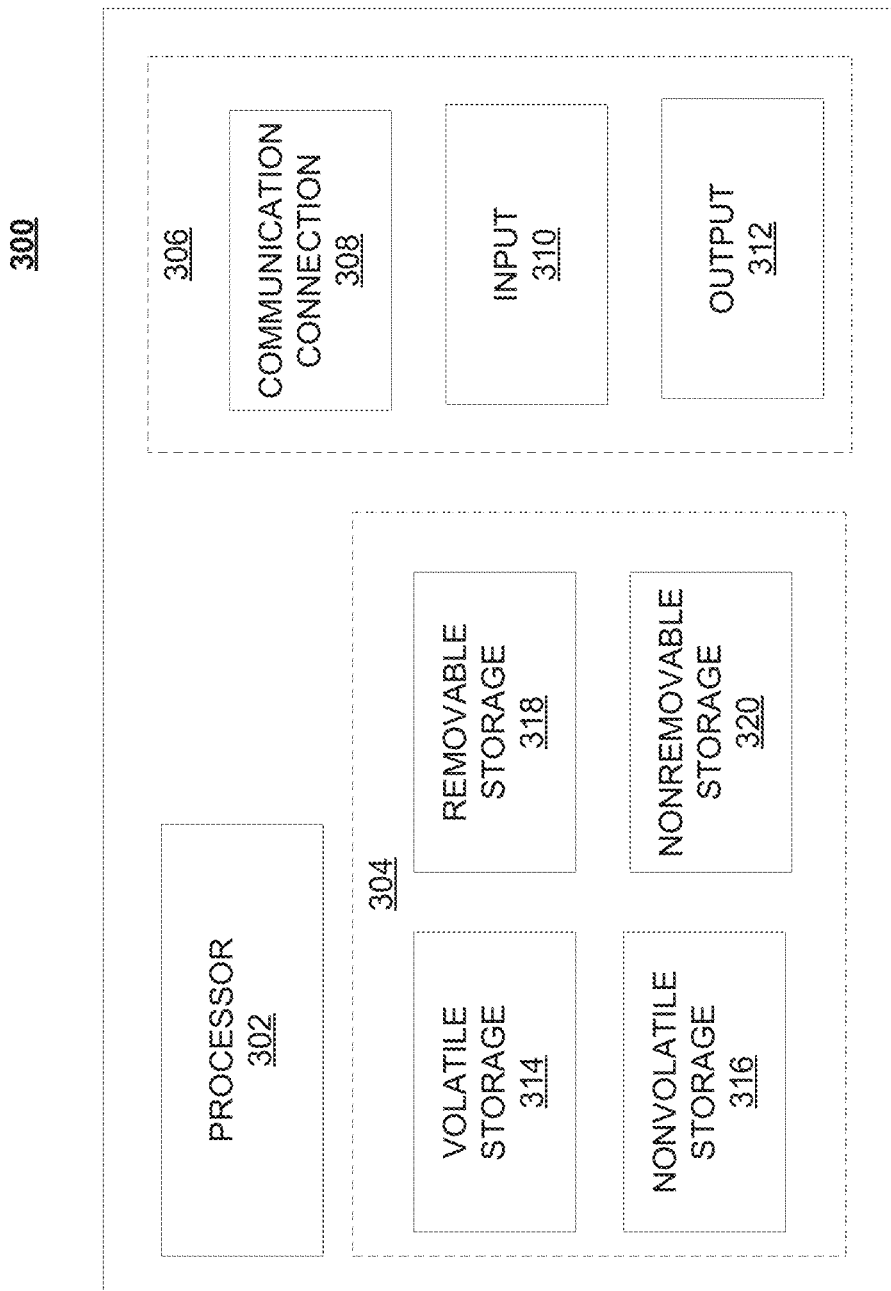
FIG. 8 illustrates a schematic of an exemplary network device.

FIG. 8 is a block diagram of network device 300 that may be connected to or include a component of system 100 or FIG. 7. Network device 300 may comprise hardware or a combination of hardware and software. The functionality to facilitate telecommunications via a telecommunications network may reside in one or combination of network devices 300. Network device 300 depicted in FIG. 8 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 8) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 9:
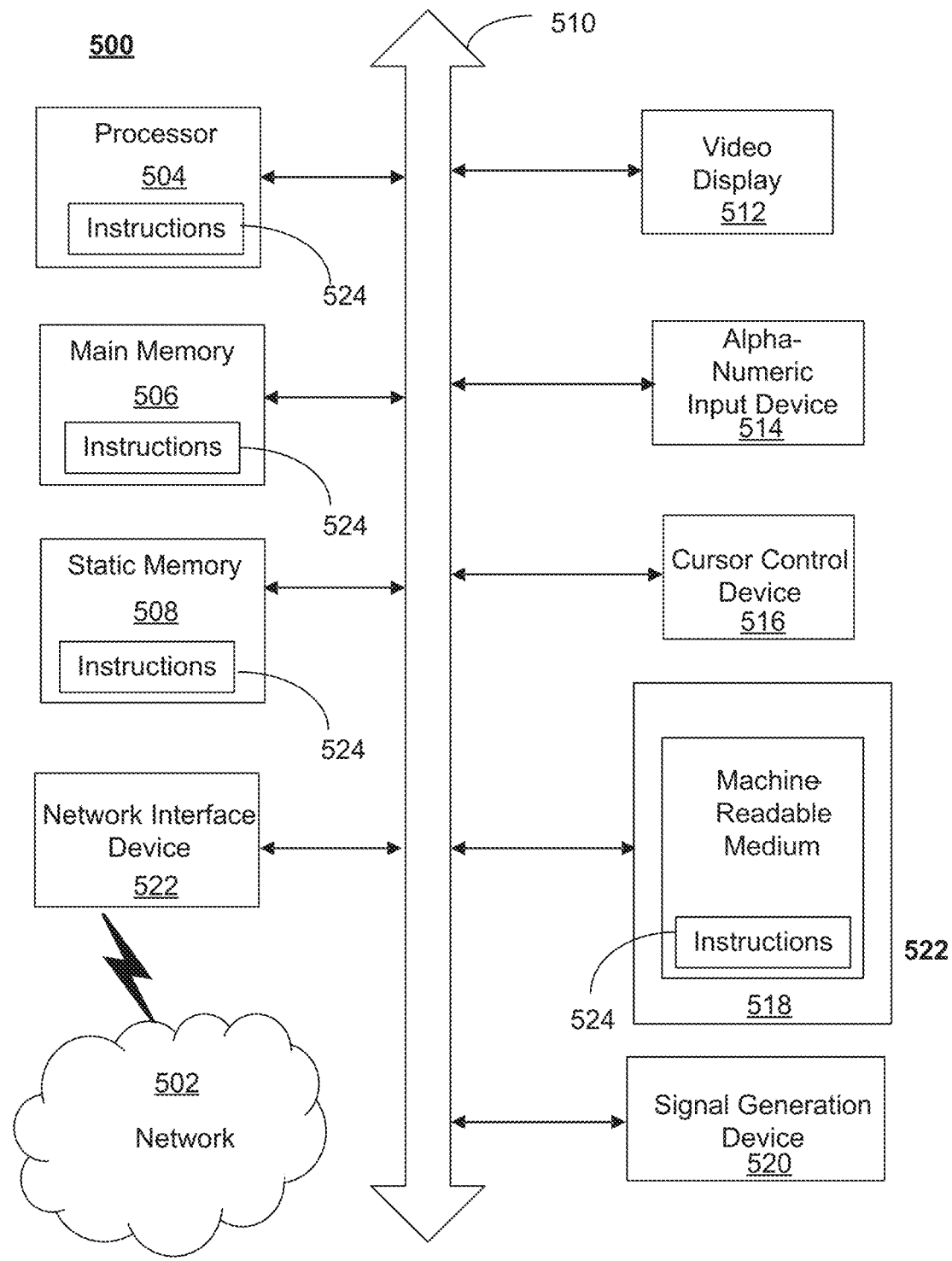
FIG. 9 illustrates an exemplary communication system that provides wireless telecommunication services over wireless communication networks.

FIG. 9 depicts an exemplary diagrammatic representation of a machine in the form of a computer system 500 within which a set of instructions, when executed, may cause the machine to perform any one or more of the methods described above. One or more instances of the machine can operate, for example, as processor 302, measurement device 106, network device 101, and other devices of FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 10A:
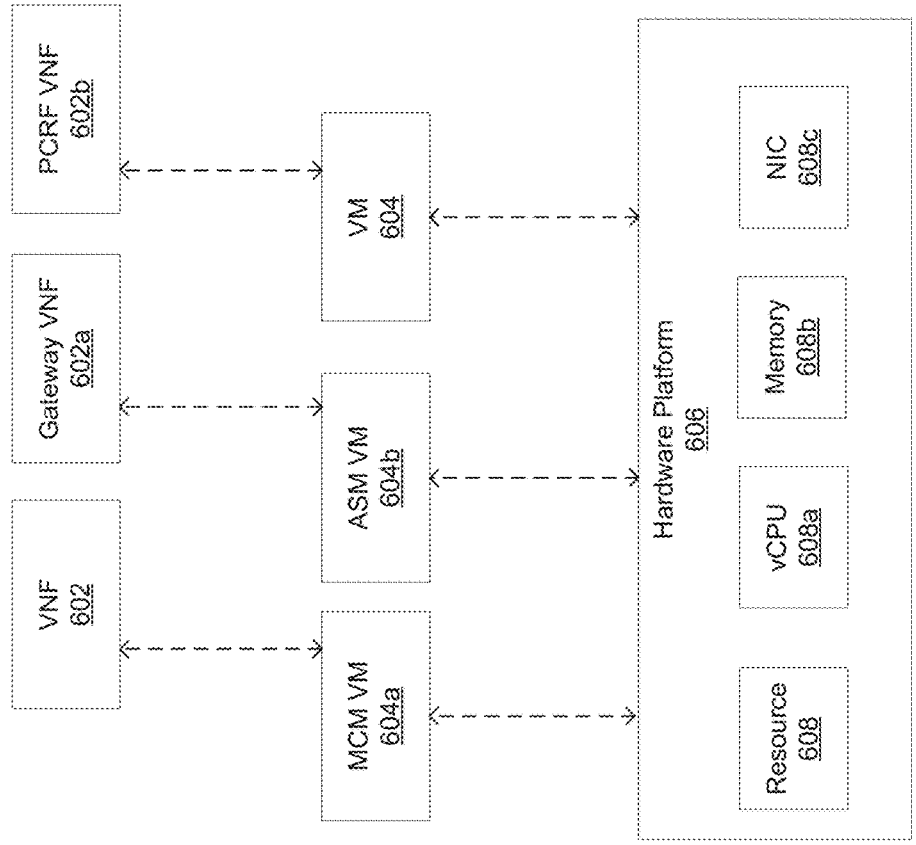
FIG. 10A is a representation of an exemplary network.

FIG. 10A is a representation of an exemplary network 600. Network 600 may comprise an SDN—that is, network 600 may include one or more virtualized functions (e.g., ConQuest) implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 10A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 10A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 10B:
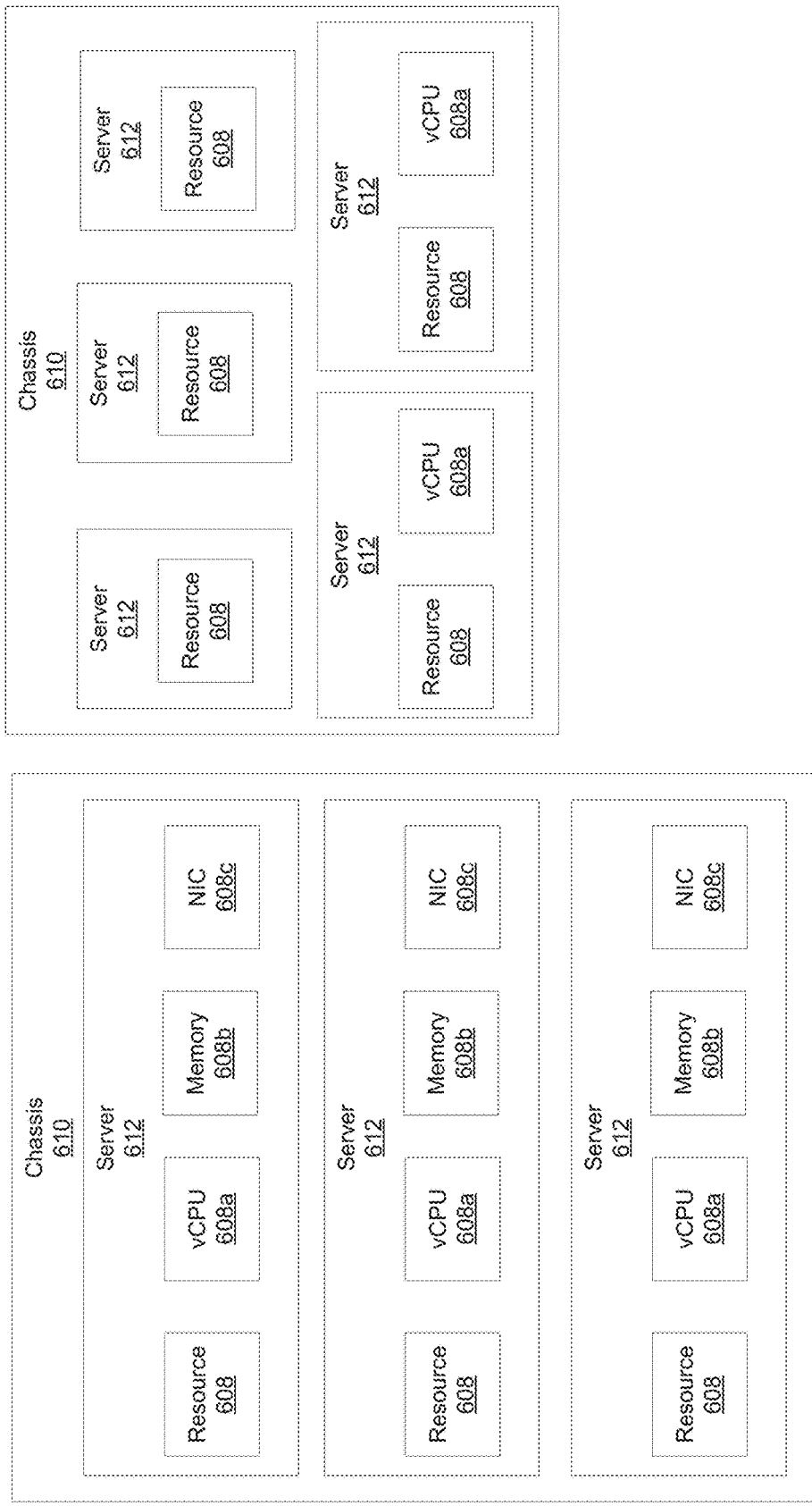
FIG. 10B is a representation of an exemplary hardware platform for a network.

While FIG. 10A illustrates resources 608 as collectively contained in hardware platform 606, the configuration of hardware platform 606 may isolate, for example, certain memory 608c from other memory 608c. FIG. 10B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 10B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a telecommunications system in which microburst detection and management can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—microburst detection management—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
   obtaining, by a device comprising a processor, a plurality of packets, wherein the obtaining of the plurality of packets uses a snapshot-based data structure to take snapshots of data comprising the plurality of packets;
   detecting, by the device and based on the snapshots, congestion associated with the device, wherein the congestion is a microburst congestion, wherein the microburst congestion comprises a change of three times or more than an average traffic rate, wherein at least one snapshot of the snapshots comprises a packet of the plurality of packets that has already departed the device, and wherein the congestion is detected based on the at least one snapshot;
   determining, by the device, that a subset of the plurality of packets associated with a flow are in a congested queue when the congestion occurs, wherein the congested queue comprises the subset of the plurality of packets associated with the flow as well as one or more packets associated with one or more other flows; and based on a quantity of the subset of the plurality of packets reaching a threshold percentage relative to all packets in the congested queue when the congestion occurs, indicating, by the device, an identifiable flow that is a culprit flow, wherein the identifiable flow comprises the subset of the plurality of packets.

2. The method of claim 1, further comprising re-routing the packets of the identifiable flow to another route.

3. The method of claim 1, further comprising adjusting a quality of service of the device associated with packets of the identifiable flow.

4. The method of claim 1, further comprising dropping packets associated with the identifiable flow.

5. The method of claim 1, further comprising load balancing packets of the identifiable flow.

6. The method of claim 1, further comprising delaying packets of the identifiable flow.

7. The method of claim 1, wherein the device is a switch.

8. A system comprising:
one or more processors; and
memory coupled with the one or more processors, the memory storing executable instructions that when executed by the one or more processors cause the one or more processors to effectuate operations comprising:
obtaining a plurality of packets, wherein the obtaining of the plurality of packets uses a snapshot-based data structure to take snapshots of data comprising the plurality of packets;
detecting, based on the snapshots, congestion associated with a switch, wherein the congestion is a microburst congestion, wherein the microburst congestion comprises a change of three times or more than an average traffic rate, wherein at least one snapshot of the snapshots comprises a packet of the plurality of packets that has already departed the switch, and wherein the congestion is detected based on the at least one snapshot;
determining that a subset of the plurality of packets associated with a flow are in a congested queue when the congestion occurs, wherein the congested queue comprises the subset of the plurality of packets associated with the flow as well as one or more packets associated with one or more other flows; and
based on a quantity of the subset of the plurality of packets reaching a threshold percentage relative to all packets in the congested queue when the congestion occurs, indicating an identifiable flow that is a culprit flow, wherein the identifiable flow comprises the subset of the plurality of packets.

9. The system of claim 8, the operations further comprising adjusting a quality of service of the switch associated with packets of the identifiable flow.

10. The system of claim 8, the operations further comprising dropping packets associated with the identifiable flow.

11. The system of claim 8, the operations further comprising load balancing packets of the identifiable flow.

12. The system of claim 8, the operations further comprising delaying packets of the identifiable flow.

13. The system of claim 8, the operations further comprising controlling one or more actions associated with the culprit flow.

14. A non-transitory computer-readable storage medium storing computer executable instructions that when executed by a computing device cause said computing device to effectuate operations comprising:
obtaining a plurality of packets, wherein the obtaining of the plurality of packets uses a snapshot-based data structure to take snapshots of data comprising the plurality of packets;
detecting, based on the snapshots, congestion associated with a device, wherein the congestion is a microburst congestion, wherein the microburst congestion comprises a change of three times or more than an average traffic rate, wherein at least one snapshot of the snapshots comprises at least two packets of the plurality of packets that have already departed the device, and wherein the congestion is detected based on the at least one snapshot;
determining that a subset of the plurality of packets associated with a flow are in a congested queue when the congestion occurs, wherein the congested queue comprises the subset of the plurality of packets associated with the flow as well as one or more packets associated with one or more other flows; and
based on a quantity of the subset of the plurality of packets reaching a threshold percentage relative to all packets in the congested queue when the congestion occurs, indicating an identifiable flow that is a culprit flow, wherein the identifiable flow comprises the subset of the plurality of packets.

15. The non-transitory computer-readable storage medium of claim 14, the operations further comprising adjusting a quality of service associated with packets of the identifiable flow.

16. The non-transitory computer-readable storage medium of claim 14, the operations further comprising dropping packets associated with the identifiable flow.

17. The non-transitory computer-readable storage medium of claim 14, the operations further comprising delaying packets of the identifiable flow.

18. The non-transitory computer-readable storage medium of claim 14, the operations further comprising re-routing the packets of the identifiable flow to another route.

19. The non-transitory computer-readable storage medium of claim 14, the operations further comprising load balancing packets of the identifiable flow.

20. The non-transitory computer-readable storage medium of claim 14, the operations further comprising controlling one or more actions associated with the culprit flow.

* * * * *